United States Patent [19]

Von Klock et al.

[11] Patent Number: 5,368,754
[45] Date of Patent: Nov. 29, 1994

[54] METHOD FOR STRIPPING CONTAMINANTS FROM WASTEWATER

[75] Inventors: Byron Von Klock, Beaumont, Tex.; Irl L. Zuber, Bakersfield, Calif.

[73] Assignee: Texaco Inc., White Plains, N.Y.

[21] Appl. No.: 85,794

[22] Filed: Jul. 6, 1993

Related U.S. Application Data

[63] Continuation-in-part of Ser. No. 607,948, Nov. 1, 1990, abandoned.

[51] Int. Cl.⁵ ............................................. C02F 9/00
[52] U.S. Cl. .................................... 210/806; 95/147; 95/170; 95/204; 95/263; 203/41; 203/49; 502/437
[58] Field of Search ............... 210/694, 767, 805, 194, 210/806, 807, 750; 502/437; 95/147, 170, 204, 263; 203/41, 49

[56] References Cited

U.S. PATENT DOCUMENTS 4,014,817  3/1977  Johnson et al. ............... 252/445
4,054,429  10/1977  Ostojic et al. ............... 55/48

Primary Examiner—Ivars Cintins
Attorney, Agent, or Firm—James L. Bailey; Kenneth R. Priem; Richard A. Morgan

[57] ABSTRACT

A method has been discovered for stripping aromatic hydrocarbon contaminants from wastewater and retaining the aromatic hydrocarbons on activated carbon. The wastewater is contacted countercurrently with stripping gas. The stripping gas is passed over a bed of activated carbon to regenerate the stripping gas. The entire volume of stripping gas is recycled to the stripping vessel. There is no purge of stripping gas or aromatic hydrocarbons to the atmosphere. The removed aromatic hydrocarbons are retained by the activated carbon and periodically recovered. An activated carbon particularly adapted for retaining and recovering aromatic hydrocarbons has been found.

9 Claims, 2 Drawing Sheets

METHOD FOR STRIPPING CONTAMINANTS FROM WASTEWATER

CROSS-REFERENCE TO RELATED APPLICATION

This application is a continuation-in-part of Ser. No. 07/607,948 filed Nov. 1, 1990 for Method And Apparatus For Stripping Contaminants From Wastewater to B. V. Klock and I. L. Zuber, now abandoned.

BACKGROUND OF THE INVENTION

1. Field of the Invention

The invention relates to environmental pollution control. More particularly, the invention relates to a method for removing and recovering volatile contaminants from wastewater. Most particularly, the invention relates to the use of activate carbon to adsorb aromatic hydrocarbons.

2. Description of other Relevant Methods in the Field

A variety of technologies have been developed and utilized to remove volatile contaminants such as hydrocarbons from chemical plant and refinery wastewater in order to render it safe for discharge into the surface and ground water supply. These technologies have been driven by the discovery that water sources proximate to industrial areas have become contaminated with volatile organic compounds such as benzene, toluene, chlorinated and halogenated solvents and other compounds derived from petroleum.

A common method used in the petroleum industry for removing volatile organic compounds has been to air strip the wastewater in a packed tower. The wastewater is stripped in a vertically oriented tower at atmosphere pressure. Contaminated wastewater is pumped into the upper portion of the packed tower and cascades downwardly through liquid-gas contacting media referred to in the art as packing. In the alternative, a series of contacting trays may be substituted for the packing. Air is forced upwardly through the packing by means of a blower or fan to volatilize organic compounds. The contaminant free wastewater is collected at the bottom of the tower and is removed for disposal consistent with any remaining contamination. The contaminant laden air is released from the top of the tower to the atmosphere. In the alternative, the air is collected and purified to reduce hydrocarbon content before release to the atmosphere.

A number of methods have been developed for separating hydrocarbon for pollution control. U.S. Pat. No. 4,054,429 to N. Ostojic et al. teaches a method and apparatus for recovering solvent from a gas such as air. By the method, solvent contaminated air is passed through an oil absorber which absorbs the solvent, producing a clean air product. The oil-solvent mixture is stripped with inert gas to produce a solvent free oil. The remaining inert gas-oil mixture is separated by first condensing the oil and then passing the inert gas through an activated charcoal filter which removes last traces of solvent from the inert gas. Cleaned inert gas is returned to the stripper for recycle in the oil-solvent stripping stage.

U.S. Pat. No. 3,876,505 to G. R. Stoneburner discloses a method of making granular activated carbon from bituminous coal. The activated carbon is made by sizing, drying, oxidizing and activating.

U.S. Pat. No. 4,014,817 to B.C. Johnson et al. discloses a method of making granular activated carbon from bituminous coal. The coal is acid washed before manufacture to slow down the activation procedure.

SUMMARY OF THE INVENTION

The invention is a method of stripping aromatic hydrocarbon compounds from a contaminated wastewater. The method comprises contacting the contaminated wastewater with stripping gas in a stripping zone and withdrawing stripping gas mixed with the aromatic compounds. The stripping gas is passed to a recovery zone where the aromatic compounds are removed by adsorption on activated carbon, thereby producing a regenerated stripping gas. The regenerated stripping gas is recycled to the stripping zone. A wastewater reduced in volatile compounds is withdrawn from the stripping zone.

The activated carbon is derived from bituminous coal. It is additionally characterized as having a BET surface area of at least 1000 m$^2$/gram and having a pore volume of 0.6 to 0.8 cc/gram. The pore volume is provided by macro pores having a radius of 200Å to 10,000Å, meso pores having a radius of 50Å to 200Å, and micro pores having a radius of less than 50Å. Sixty percent to ninety percent of the pore volume is provided by macro pores and meso pores and the balance provided by micro pores.

The macro pores and meso pores are effective in adsorbing aromatic hydrocarbon compounds. The low micro pore distribution is effective for desorbing hydrocarbon compounds. The activated carbon therefore has high capacity for both adsorption and desorption, defined as working capacity.

DETAILED DESCRIPTION OF THE INVENTION

Figure 1:
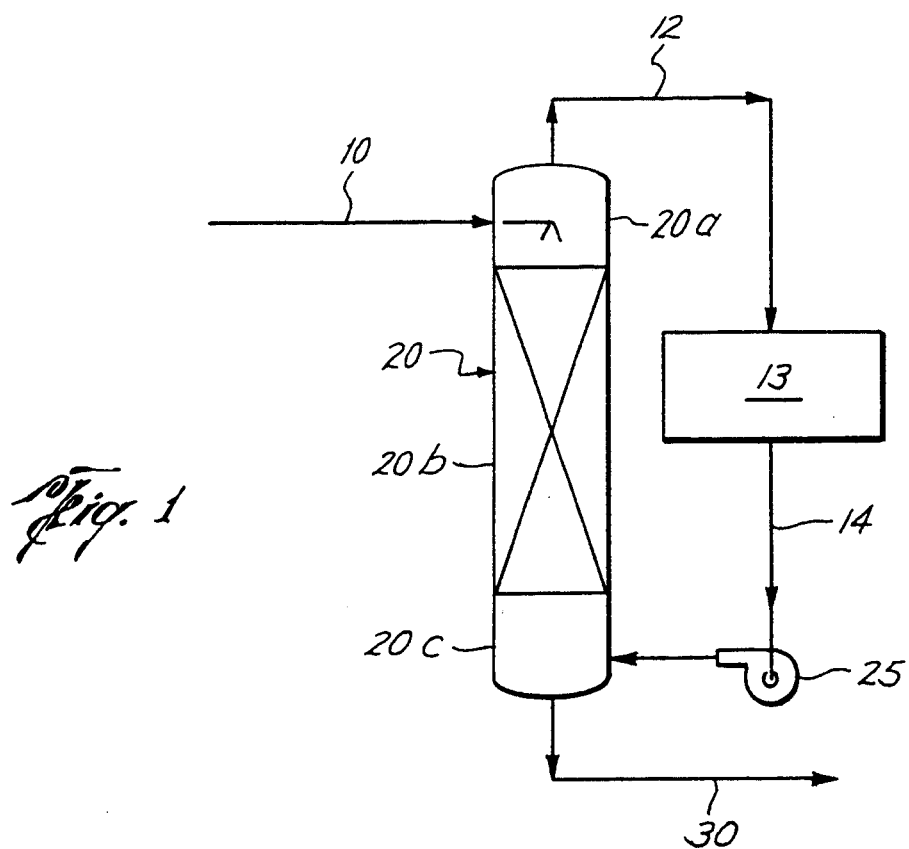
FIG. 1 is a schematic method and apparatus for removing contaminants from wastewater according to the invention.

Reference is made to FIG. 1 which is representative of a method for removing volatile contaminants from wastewater. Wastewater is a general term which describes industrial water which is contaminated by any petroleum, coal, or shale oil derived material. The contaminants comprise low molecular weight hydrocarbons and other compounds which are quite soluble in water. Aromatic hydrocarbon contaminants include benzene, toluene and xylene. These are found in combination with other contaminants such as ethers, ketones, gasoline, diesel fuel, light oils, aliphatic hydrocarbons, and halogenated hydrocarbons such as trichloroethylene, tetrachloroethylene, carbon tetrachloride and the freons. Volatile inorganic compounds include ammonia, hydrogen sulfide and hydrogen cyanide. The amount of contamination is not critical. One percent by volume is a common amount of contaminant, with much larger amounts not uncommon.

Wastewater, containing about 100 ppm dissolved aromatic hydrocarbon is passed via line 10 to stripper vessel 20. Stripper vessel 20 is vertically oriented and has a height of 20 to 40 ft. and a diameter of 2 to 15 ft. sized for a wastewater rate through the vessel of about 5000 to 30,000 lb/sq. ft.-hr. The vessel 20 comprises three sections: an upper portion 20a, a medial contacting portion 20b and a lower portion 20c. The wastewater is distributed across the top of the upper portion 20a. An aromatic hydrocarbon contaminated stripping gas is also withdrawn from upper portion 20a via line 12. The hydrocarbon withdrawn via line 12 is essentially all of the hydrocarbon contained in the wastewater introduced via line 10. The material in line 12 is passed to a recovery system 13 which comprises an activated carbon bed which removes about 95% of the hydrocarbon in an absorption process. A stripping gas containing less than 10 ppm hydrocarbon is sufficiently regenerated for reuse in the stripping operation. Regenerated stripping gas is passed via line 14 to blower 25.

Blower 25 forces stripping gas into the lower portion 20c of stripper vessel 20c. The stripping gas use, regeneration and recirculation is carried out in the absence of purging stripping gas to the atmosphere. Therefore, none of the aromatic hydrocarbon is vented to the atmosphere. The stripping gas composition includes any of the chemically inert gases used for this purposes, e.g. air, nitrogen, carbon dioxide, methane, ethane, ethylene, propane, propylene, helium, hydrogen, neon, argon and mixtures thereof. Nitrogen is preferred because it suppresses aerobic bacterial growth. Blower 25 discharges gas at a rate of about 10 to 100 times the volumetric flow rate of wastewater. The stripping gas and wastewater are contacted countercurrently in medial contacting portion 20b at temperatures in the range of 40° F. to 150° F. and pressures of 0.98 to 2 atmospheres. In order to enhance the surface area for contacting portion 20b is filled with tower packing material. Packing consists of irregularly shaped material which provides passageways for gas and liquid to flow countercurrently through the entire length of the medial contacting portion. The surface area of the packing also provides area for thin film contacting of liquid and gas and the transfer of volatile hydrocarbon from the wastewater to the stripping gas.

In the alternative, contacting portion 20b may comprise trays designed for the contacting of liquids and gases such as bubble cap trays or value trays.

The transfer of aromatic hydrocarbon compounds from a water phase to a gas phase is mathematically described by Henry's Law. For the contacting of liquid water and gases, Henry's Law states that at low concentrations the partial vapor pressure of a volatile hydrocarbon compound is equal to the concentration of the compound in the water phase multiplied by a Henry's Law constant. This is expressed by the equation:

$$Y = (H/P_t)X$$

wherein:
Y = concentration of hydrocarbon compound in vapor phase,
X = concentration of hydrocarbon compound in liquid phase.
H = Henry's Law constant, atm.
$P_t$ = Total pressure, atm.

Figure 2:
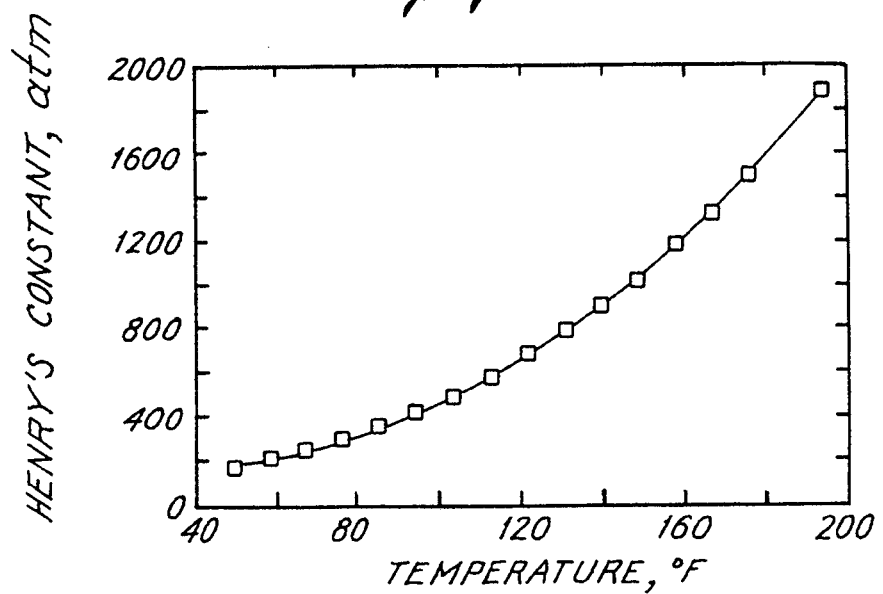
FIG. 2 is a plot of data of Henry's Law Constant vs. Temperature for Benzene.

FIG. 2 is a plot of Henry's Law constant vs. temperature for the aromatic compound benzene. At 100° F., the Henry's Law constant for benzene is 450 atm. This value is used to calculate liquid-vapor equilibrium concentrations in the stripper vessel. The results of these calculations are plotted in FIG. 3 for benzene at 1 atm total pressure at 100° F.

Figure 3:
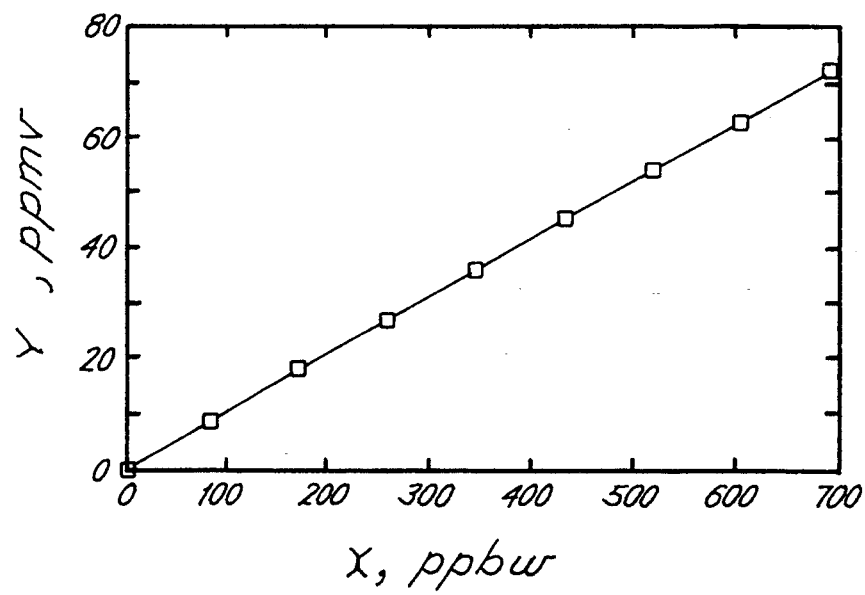
FIG. 3 is a plot of vapor-liquid equilibrium data for benzene.
Figure 4:
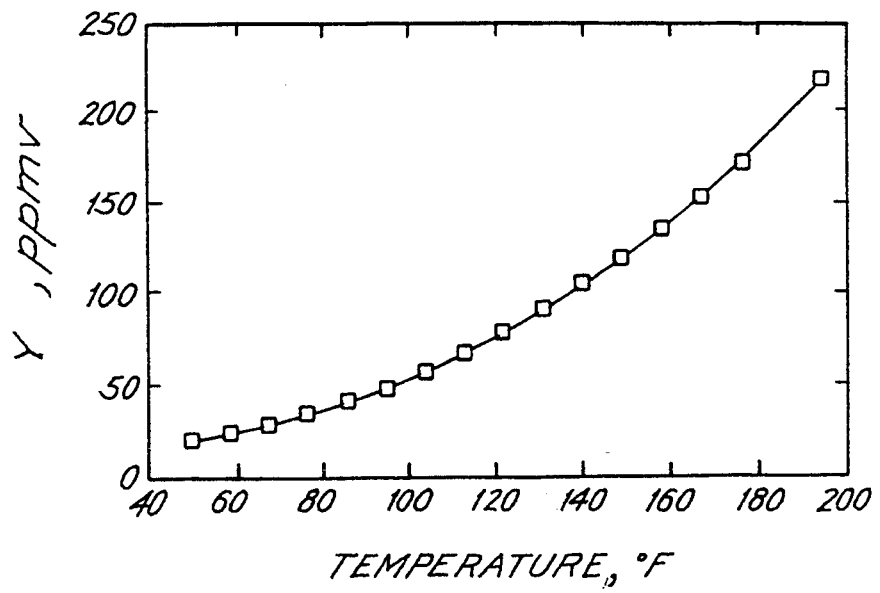
FIG. 4 is a plot of data of maximum benzene vapor concentration vs. temperature.

FIG. 3 is used to determine the operating range for the stripper. For example, if it is desired to produce a wastewater stream of less than 500 ppbw benzene it is required that the stripping gas leaving the stripper have a concentration of at least 50 ppmv at 100° F. By the same procedure, the limiting (maximum) concentration of benzene in the stripping gas to achieve a benzene concentration of 500 ppbw in wastewater at a series of temperatures from 50° F. to 195° F. was calculated. The results are plotted in FIG. 4. From FIG. 4 it is seen that at 120° F., a 75 ppmw benzene in the stripper gas yield a 500 ppmv wastewater.

Perry's Chemical Engineers' Handbook 4th Ed. pp. 14-3 to 14-11 lists Henry's Law constants for common industrial systems and references Seidell, Landolt-Boernstein, *International Critical Tables*, Vol. 3, pp 371–381 for solubilities of gases in aqueous solutions.

The design of packed columns and tray columns for the gas stripping of contaminants from wastewater has become well quantified and design techniques are published in references such as op. cit. Perry's pp 18-3 to 18-51.

Recovery system 13 contains a bed of activated carbon. The bed of activated carbon is sized using absorption factors for the identified volatile compounds contained in the stripping gas. Based on these absorption factors, an amount of activated carbon is used to give a convenient run length. In practice two beds of activated carbon are provided. While one bed is on line, the other bed is regenerated. Thermal swing regeneration consists of passing hot regeneration gas through the bed at a temperature and for sufficient time based on experience to desorb contaminants. Steam is the preferred regeneration gas. Steam may be passed through the bed at a temperature of 212° F. to 300° F. for 2 to 6 hours to regenerate the activated carbon. The amount of steam is 1 lb. steam/lb. of activated carbon or less.

Other hot regeneration gases are nitrogen, air, hydrogen, helium, argon and carbon dioxide. The purge gas from the regenerating activated carbon bed is passed to light ends fractionization for capture and recycle appropriate with their use and value. When regeneration is completed, the activated carbon bed is returned to service and the other bed taken off line for regeneration. In this manner, fresh adsorbent is always available to decontaminate offgas.

We have found that the method of the invention requires a proper choice of coal starting material for making the activated carbon. The method requires a bituminous coal as defined in *Classification of Coals by Rank*, American Standards Association, ASTM D-388-64T (1964). Bituminous coal yields the pore structure required of the method of the invention. Subbituminous coal, lignite or wood yield a pore structure which is not suited to the removal of aromatic hydrocarbons from the vapor phase.

The bituminous coal starting material should be a mined, naturally occurring product which has not been treated or processed in such a way as to alter its inherent properties. In the forming and activation process, coal looses 60 to 70 wt % of its carbon content, though it looses none of its mineral content. Minerals found in coal are generally defined as inorganic materials which are analyzed as ash in fully oxidized coal. Minerals include silicates, aluminates, alumino silicates, calcium, magnesium, sodium, potassium and iron which collectively comprise 95 wt % of ash. A relatively poor grade of bituminous coal comprises 4 to 5 wt % or more mineral matter. A good bituminous coal comprises 3 to 4 wt % mineral matter and yields 8 to 12 wt % activated carbon. The best bituminous coals comprise 2 wt % or less mineral matter and yields the greatest quantity of activated carbon.

The bituminous coal is first crushed and optionally acid washed according to U.S. Pat. No. 4,014,817 incorporated herein by reference and then separated to a powder size in the range of No. 2 U.S. sieve to No. 40 U.S. sieve, preferably No. 4 U.S. sieve to No. 8 U.S. sieve. The coal powder is slurried with water and 5 to 25 wt % of a carbonaceous binder such as starch or coal tar pitch to make a paste. Polymeric binders include polymers and copolymers of acrylic esters, methacrylic esters, acrylamides and methacrylamides or lignins modified, for example, with hexamethylene tetramine. The paste is of the consistently required to pass through an extruder to form pellets having a radius of 2 mm to 6 mm and a length/diameter ratio of about 2 to 4.

The pellets are first surface oxidized by air baking at a temperature of 240° F. (115° C.) to 750° F. (400° C.) for a period of 120 to 360 minutes. It is desirable to introduce the pellets into the baking zone at a temperature of about 212° F. (100° C.) and gradually raise the temperature to the final baking temperature over a period of 45 to 60 minutes. Such a gradual rise in temperature causes the surface of the pellets to loose moisture and oxidize without the formation of coke which would be undesirable. Air or oxygen enriched air is forced into the baking zone by means of a fan. The pellets swell by a small amount during baking until the external surface is dried and oxidized. After oxidization the pellet size is fixed and will not change during the remaining activation procedure.

The pellets are next carbonized in inert atmosphere at a temperature of 800° F. (426° C.) to 1200° F. (649° C.). The pellets are brought to a temperature of about 1000° F. for 5 to 20 minutes in a closed muffle furnace under nitrogen atmosphere for 5 to 20 minutes to drive all water, oxygen and other volatile material to produce a char. The resulting char has relatively little surface area and no porosity.

The char is activated to create pore volume of 0.6 to 0.8 cc/gram. In the activation procedure the char is exposed to a controlled oxygen activation atmosphere such as steam, carbon dioxide, air or mixtures thereof at a temperature of 1500° F. to 2000° F. for a period sufficient to bring about the desired pore volume for 30 minutes to 10 hours. Chemical agents such as zinc chloride, phosphoric acid, sulfuric acid and others may also be used for activation. The atmosphere composition and temperature is adjusted to bring about the desired pore size distribution.

In particular small micro pores having a radius of less than 50Å should be minimized. It has been found that 60% to 90% of the pore volume can be distributed between meso pores of 50Å to 200Å and macro pores of 200Å to 10,000Å or greater.

A pore volume of 0.6 to 0.8 cc/gram, typically 0.65 to 0.15 cc/gram is achieved with a substantial portion of the pore volume in the meso and macro pore range. The presence of a significant portion of the pore volume in this range provides a pore structure which permits the adsorption of relatively large hydrocarbon molecules such as aromatic hydrocarbons. A relatively small proportion of the pore volume is taken up by micro pores which are not useful for adsorbing aromatic hydrocarbons.

The working capacity of an activated carbon is the total capacity, less the retentivity. Total capacity is a function of the total surface area, typically 30% to 35% of the surface area. This surface area resides almost entirely in the pores. Retentivity is the surface area, expressed as a percentage, from which hydrocarbon cannot be desorbed, typically 28% to 33%. Micro pores contribute a substantial portion of the retentivity in activated carbon in an aromatics adsorption process. The low microporosity of the activated carbon provides a large working capacity for the activated carbon.

This invention is shown by way of Example.

EXAMPLE 1A

Activated carbon was manufactured from bituminous coal by the procedure and had the following properties:

| | |
|---|---|
| Size | 4 mm pellet |
| Carbon tetrachloride number | 65% |
| Rententively | 28% |
| BET Surface Area | 1100 minimum |
| Pore Volume | 0.7 cc/gram |
| Void Fraction | 40% |
| Moisture | 1% or less |
| Hardness No. | 95 minimum |
| Apparent Density | 0.4 g/cc (27 lb/ft$^3$) |
| Iodine No. | 1000 |
| Ash | 12–15 wt % |
| Macro Pores | 30–50% of pore volume |
| Meso Pores | 30–40% of pore volume |

EXAMPLE 1B

The system in FIG. 1 was simulated with digital computer by the application of Henry's Law. In the simulation, benzene was air stripped from 400 gallons per minute of wastewater at a concentration of 5.0 mg/L (milligrams/liter) to 0.2 mg/L at a stripper temperature of 80° F.

The Henry's Law constant for benzene at 80° F. is 0.00111 psia benzene/parts per million benzene in water by weight (wppm).

A stripper with four theoretical plates was calculated to yield 0.0061 mg/L benzene in wastewater at an air:water volume ratio of 20:1. The off-gas contained 78.6 ppm benzene by volume (0.00115 psia benzene).

The offgas was corrected by condensation from 100% relative humidity to 50% relative humidity at 110° F. and passed over a 3000 lb. bed of the activated carbon of Example 1A with a removal efficiency. The offgas, recycled to the stripper, contained 3.9 ppm benzene by volume.

| TABLE OF TEST METHODS | |
|---|---|
| Carbon Tetrachloride Number | ASTM D-3467 |
| Moisture | ASTM D-2867 |
| Hardness No. | ASTM D-3802 |
| Apparent Density | ASTM D-2854 |
| Iodine No. | ASTM D-4607 |
| Ash | ASTM D-2866 |

While particular embodiments of the invention have been described, it will be understood that the invention is not limited thereto since many modifications may be made, and it is, therefore, contemplated to cover by the appended claims any such modifications as fall within the true spirit and scope of the invention.

What is claimed is:

1. A method for recovering aromatic hydrocarbon compounds from wastewater comprising the steps of:

passing a stripping gas through a stripping zone by means of a gas circulation means, contacting said contaminated wastewater countercurrent to said stripping gas in said stripping zone, withdrawing stripping gas mixed with aromatic hydrocarbon compounds from said stripping zone, flowing said stripping gas and aromatic hydrocarbon compounds to a recovery zone wherein aromatic hydrocarbon compounds are removed by adsorption on activated carbon to produce regenerated stripping gas, passing said regenerated stripping gas to said gas circulation means thereby recycling said stripping gas to said stripping zone, wherein said activated carbon:

(a) is derived from bituminous coal, (b) has a BET surface area of at least 1000 $m^2$/gram, and (c) has a pore volume of 0.6 to 0.8 cc/gram provided by macro pores having a radius of 200Å to 10,000Å, meso pores having a radius of 50Å to 200Å, and micro pores having a radius of less than 50Å wherein 60 to 90% of the pore volume is provided by macro pores and meso pores and the balance provided by micro pores.

2. The method of claim 1 wherein in the activated carbon 30% to 50% of the pore volume is provided by macro pores and 30% to 40% of the pore volume is provided by meso pores.

3. The method of claim 1 wherein in the activated carbon the BET surface area is at least 1100 $m^2$/gram.

4. The method of claim 1 wherein in the activated carbon the pore volume is 0.65 to 0.75 cc/gram.

5. The method of claim 1 wherein the bituminous coal comprises 4 wt % or less minerals.

6. The method of claim 1 wherein the bituminous coal comprises 3 wt % or less minerals.

7. A method for recovering aromatic hydrocarbon compounds from wastewater comprising the steps of:

passing a stripping gas through a stripping zone by means of a gas circulation means, contacting said contaminated wastewater countercurrent to said stripping gas in said stripping zone, withdrawing stripping gas mixed with aromatic hydrocarbon compounds from said stripping zone, flowing said stripping gas and aromatic hydrocarbon compounds to a recovery zone wherein aromatic hydrocarbon compounds are removed by adsorption on activated carbon to produce regenerated stripping gas, passing said regenerated stripping gas to said gas circulation means thereby recycling said stripping gas to said stripping zone, wherein said activated carbon:

(a) is derived from bituminous coal, (b) has a BET surface area of at least 1100 $m^2$/gram, and (c) has a pore volume of 0.6 to 0.8 cc/gram provided by macro pores having a radius of 200Å to 10,000Å, meso pores having a radius of 50Å to 200Å, and micro pores having a radius of less than 50Å wherein 30% to 50% of the pore volume is provided by macro pores, 30% to 40% of the pore volume is provided by meso pores and the balance provided by micro pores.

8. The method of claim 7 wherein the bituminous coal comprises 4 wt % or less minerals.

9. The method of claim 7 wherein the bituminous coal comprises 3 wt % or less minerals.

* * * * *